United States Patent [19]
Hutchinson et al.

[11] 3,886,229
[45] May 27, 1975

[54] SHAPED POLYMERIC ARTICLES

[75] Inventors: Francis Gowland Hutchinson, Lymm; Richard George Cleveland Henbest, Frodshum; Margaret Kenley Leggett, Northwich, all of England

[73] Assignee: Imperial Chemical Industries Limited, London, England

[22] Filed: July 17, 1972

[21] Appl. No.: 272,715

Related U.S. Application Data
[63] Continuation-in-part of Ser. No. 60,614, Aug. 3, 1970, abandoned.

[30] Foreign Application Priority Data
Aug. 21, 1969 United Kingdom............... 41844/69
May 11, 1970 United Kingdom............... 22167/70

[52] U.S. Cl....... 260/859 R; 260/40 TN; 260/42.17; 260/42.18; 260/75 NP; 260/75 TN; 260/77.5 CR; 260/858
[51] Int. Cl.²......................................... C08G 41/04
[58] Field of Search..................................... 260/859

[56] References Cited
UNITED STATES PATENTS

| | | | |
|---|---|---|---|
| 2,806,836 | 9/1957 | Nischk | 260/859 |
| 2,915,493 | 12/1959 | Nischk | 260/859 |
| 3,008,917 | 11/1961 | Park | 260/859 |
| 3,047,530 | 7/1962 | Nischk | 260/859 |
| 3,371,056 | 2/1968 | Delius | 260/859 |
| 3,448,171 | 6/1969 | Damusis | 260/859 |
| 3,448,172 | 6/1962 | Damusis | 260/859 |
| 3,491,050 | 1/1970 | Keberle | 260/859 |

FOREIGN PATENTS OR APPLICATIONS
994,297  6/1965  United Kingdom................ 260/859

*Primary Examiner*—Paul Lieberman
*Attorney, Agent, or Firm*—Cushman, Darby & Cushman

[57] ABSTRACT

A polymeric product formed from
a. 5 to 95 percent by weight of the precursors of a linear polyurethane comprising at least one diisocyanate and at least one difunctional compound containing two groups reactive with isocyanate groups, each unit derived from the difunctional compound in the polymeric product providing an average of not more than 35 in-chain atoms in the macromolecular chains of the product, and
b. 95 to 5 percent by weight of the precursors of a cured polyester resin comprising
 i. at least one ethylenically unsaturated polyester, and
 ii. at least one monomer copolymerisable with the ethylenically unsaturated groups in the polyester.

17 Claims, No Drawings

SHAPED POLYMERIC ARTICLES

This is a Continuation-In-Part of prior U.S. application, Ser. No. 60,614 filed Aug. 3, 1970, now abandoned.

This invention relates to shaped polymeric articles and in particular to shaped polymeric articles formed from the precursors of a linear polyurethane and the precursors of a cured polyester resin, and to a process for their production.

Cured polyester resins formed from an ethylenically unsaturated polyester and a monomer copolymerizable with the ethylenically unsaturated groups in the polyester are known to suffer from certain disadvantages. For example, the impact strengths of such resins are generally very low, that is, the resins are generally brittle.

We have now found that products having improved impact strengths may be obtained if the ethylenically unsaturated polyester and the monomer copolymerizable with the ethylenically unsaturated groups in the polyester are reacted with the precursors of a linear polyurethane comprising at least one diisocyanate and at least one difunctional compound reactive with the isocyanate, provided that the difunctional compound is chosen so as to provide in the macromolecular chains of the resultant polymeric product units having a chain length not greater than a defined maximum length. The impact strengths of the products of our invention, and in some cases other properties, are better than the corresponding properties of products prepared by reacting the precursors of a cured polyester resin with a diisocyanate alone or by reacting the said precursors with the precursors of a linear polyurethane in which the difunctional compound provides units in the macromolecular chain of the products having a chain length above our defined maximum length.

The products of our invention have a useful combination of properties in that they are generally transparent or substantially transparent, have relatively high heat distortion temperatures and have good mechanical properties, e.g. flexural moduli and flexural strengths.

According to the present invention, we provide a polymeric product formed from a. 5 to 95 percent by weight of the precursors of a linear polyurethane comprising at least one diisocyanate and at least one difunctional compound free from ethylenic unsaturation and containing two groups reactive with isocyanate groups, each unit derived from the difunctional compound in the polymeric product providing an average of not more than 35 in-chain atoms in the macromolecular chains of said product, and b. 95 to 5 percent by weight of the precursors of a cured polyester resin comprising
   i. at least one ethylenically unsaturated polyester containing in each molecule at least two groups reactive with isocyanate groups, and
   ii. at least one monomer copolymerizable with the ethylenically unsaturated groups in the polyester, said polymeric product being formed by a polymerization reaction in which the precursors of the polyurethane react together and with the isocyanate reactive groups of the ethylenically unsaturated polyester and the copolymerizable monomer reacts with the ethylenically unsaturated groups in the polyester.

By in-chain atoms we mean atoms forming part of the macromolecular chain of the polymeric product and excluding atoms or groups pendent from the chain.

Where the difunctional compound includes one or more in-chain cyclic groups, it is to be understood that the number of in-chain atoms in the units in the resultant polymeric product derived therefrom is determined by counting the number of atoms on the shortest route, in the structural formula, of the two possible routes round each ring. Thus, for example, where the units derived from the difunctional compound include an in-chain isophthalic or 1,3-cyclohexyl group, this group provides three in-chain atoms. Similarly, in-chain phthalic and terephthalic groups provide two and four in-chain atoms respectively.

The difunctional compound of the polyurethane precursors may be, for example, a diol, a diacid, or a low molecular weight condensate of a diol and a diacid.

Suitable diols include, for example, alkylene glycols, e.g. ethylene glycol, propylene glycol, butylene glycol, neopentylene glycol and cyclohexane-1:3-diol; poly(alkylene glycols) e.g. diethylene glycol, triethylene glycol, dipropylene glycol; and higher molecular weight poly(alkylene glycols), e.g. poly(ethylene-glycol) and poly(propylene glycol). The poly(alkylene glycols) should, of course, not be of such high molecular weight as to provide in the macromolecular chains of the resultant polymeric product units having a length greater than the defined maximum limit. Diols containing aromatic groups may also be used, e.g. diols having the structure

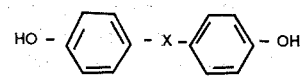   I where X is a direct linkage or a divalent group, e.g. $-SO_2-$, $-O-$ or

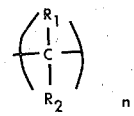

where $n$ is a whole number, preferably 1 to 4, and $R_1$ and $R_2$ are selected from hydrogen atoms and hydrocarbyl, especially alkyl groups.

A preferred diol having the structure I is 2:2'-bis (p-hydroxy-phenyl) propane having the structure:

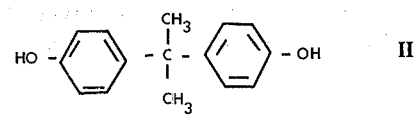   II

On account of the desirable properties of the polymeric products derived therefrom particularly preferred diols are oxyalkylated derivatives of the diols of structure I, that is diols having the structure:

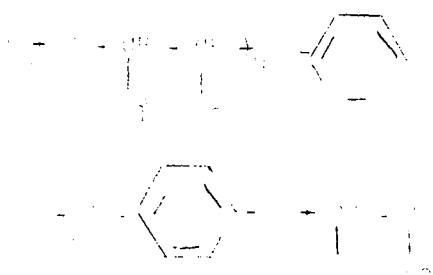

III where $R_1$ and $R_2$ are selected from hydrogen atoms and hydrocarbyl groups preferably alkyl groups, e.g. methyl.

The value of $n + m$ must be such that the units in the resultant polymeric product derived from the diol provide an average of note more than 35 in-chain atoms in the macromolecular chains thereof.

A preferred diol having the structure III is an oxyalkylated derivative of 2:2'-bis(p-hydroxyphenyl)propane, that is, a diol of structure III in which X is

|
| and in which $n + m$ is not greater than 8, preferably in the range 2 to 4. Particularly preferred is the oxypropylated derivative in which one of $R_1$ and $R_2$ is H and the other is $CH_3$ and $n + m$ is a whole number not greater than 8, preferably in the range 2 to 4. Suitably $n$ and $m$ are both whole numbers of 1 to 2.

If desired, one or both of the aromatic groups in the diol of structures I, II and III may be fully saturated.

Suitable diacids include, for example, succinic, adipic, glutaric and sebacic acids, isophthalic acid and terephthalic acid, or mixtures thereof.

Low molecular weight polyesters useful as the difunctional compound may be, for example, condensates of at least one of the above-mentioned diacids with, for example, at least one alkylene glycol, e.g. ethylene glycol, propylene glycol, butylene glycol, neopentylene glycol, diethylene glycol, triethylene glycol and dipropylene glycol. A suitable polyester is a condensate of propylene glycol and adipic acid.

The preferred number of in-chain atoms in the units in the polymeric product derived from the difunctional compound depends on the nature of the difunctional compound and on the particular property of the product which is of interest.

For example, where the difunctional compound is a diol having the structure III in which X is

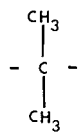

and one of $R_1$ and $R_2$ is H and the other is methyl, it is preferred that $n$ plus $m$ be in the range 2 to 4 and preferably that $n$ and $m$ in each be whole number of 1 to 2, that is, the number of in-chain atoms in the units in the polymeric product derived from the difunctional compound is preferably in the range 17 to 23. We find that where $n$ and $m$ are within the above range products having particulary high impact strengths and good flexural properties are obtained.

Where the difunctional compound is a poly(alkylene glycol), and in particular where the poly(alkylene glycol) is poly (ethylene-glycol) or poly(propylene glycol), we prefer the number of in-chain atoms provided by the difunctional compound to be in the range 9 to 18, that is, we prefer the units derived from the difunctional compound to comprise from 3 to 6 linked ethyleneoxy or propyleneoxy units. Preferably the average molecular weight of the poly(ethylene glycol) or poly(propylene glycol) used as the difunctional compound is in the range 140 to 370.

Similarly, where products having high impact strength and good flexural properties is desired and the difunctional compound is a low molecular weight polyester, it is preferred to use polyesters having an average molecular weight in the range 150 to 350 or even 400.

The diisocyanate component of the polyurethane precursor may be, for example, an aliphatic diisocyanate, an aromatic diiocyanate or a cycloaliphatic diisocyanate, or may contain in the diiocyanate an aromatic and aliphatic isocyanate group, an aromatic a cycloaliphatic group, or an aliphatic and a cycloaliphatic group.

As examples of the diisocyanate component of the polyurethane precursors there may be mentioned 4:4'-dicyclohexylmethane diisocyanate, hexamethylene diisocyanate, 2:4-toluene diisocyanate, 2:6-toluene diisocyanate or a mixture of said toluene diisocyanates.

Where polymeric products having high impact strength and good flexural properties are desired a preferred diisocyanate is one having the structure:

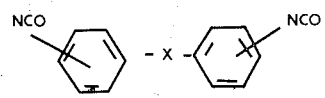

where X is a divalent group. X may be for example, a group having the structure:

where $n$ is a whole number preferably 1 to 3, and $R_1$ and $R_2$ are selected from hydrogen atoms and hydrocarbyl groups, for example, alkyl, e.g. methyl. A preferred diisocyanate is 4:4'-diphenylmethane diisocyanate.

The ethylenically unsaturated polyester may be derived, for example, by esterification of an unsaturated dicarboxylic acid or mixture of such acids with a saturated glycol or mixture of such glycols, or by esterification of a saturated dicarboxylic acid or mixture of such acids with an unsaturated glycol or mixture of such glycols. If desired an unsaturated acid or acids may be used together with or in place of the saturated acid or acids, and an unsaturated glycol or glycols may be used together with or in place of the saturated glycol or glycols. An anhydride may be used in place of the corresponding dicarboxylic acid. Examples of unsaturated polyesters include, for example, those formed by esterification of maleic, fumaric or itaconic acids, or mixtures thereof with each other and/or with saturated dicarboxylic acids with, for example, ethylene glycol, propylene glycol or butylene glycol, or mixtures thereof with each other and/or other dihydric alcohols. Unsaturated polyesters that may be mentioned in particular are condensates of isophthalic acid and fumaric acid with propylene glycol, condensates of maleic anhydride and phthalic anhydride with propylene glycol and optionally with either diethylene glycol or adipic acid, and condensates of propylene glycol with fumaric acid or maleic acid and optionally also with phthalic anhydride.

Examples of suitable monomers copolymerizable with the ethyleneically unsaturated groups in the polyester include vinyl monomers, for example, vinyl esters, aromatic vinyl compounds and vinyl nitriles. Suitable vinyl esters include, for example, vinyl acetate and esters of acrylic acid having the formula $CH_2=CH-COOR$, where R is an alkyl, aryl, alkaryl, aralkyl or cycloalkyl group. For example, R may be an alkyl group having from 1 to 20, and preferably 1 to 10 carbon atoms. Particular vinyl esters which may be mentioned include for example, methyl acrylate, ethyl acrylate, n- and iso-propyl acrylates, and n-, iso- and tertiary-butyl acrylates.

Other suitable vinyl esters include, for example, esters of formula $CH_2=C(R')COOR$, where R' may be an alkyl, aryl, alkaryl, aralkyl or cycloalkyl group. In the ester of formula $CH_2=C(R')COOR$, R and R' may be the same or different. Particular vinyl esters which may be mentioned include, for example, methyl methacrylate, ethyl methacrylate, n- and iso-propyl methacrylate, and n-, iso and tertiary-butyl methacrylate.

Aromatic vinyl compounds which may be mentioned include, for example, styrene and derivatives thereof, e.g. α-alkyl derivatives of styrene, e.g. α-methyl styrene, and vinyl toluene.

Suitable vinyl nitriles include, for example, acrylonitrile and derivatives thereof, e.g. methacrylonitrile.

Polyfunctional vinyl monomers, that is, monomers containing two or more vinyl groups are also suitable. Suitable monomers include, for example, glycol dimethacrylate, divinyl benzene and diallyl phthalate.

The proportion of monomer copolymerizable with the ethylenically unsaturated polyester to ethylenically unsaturated polyester in the cured polyester resin precursors may, for example, be in the range 30 to 90 percent by weight of at least one monomer copolymerizable therewith. More suitably, the said precursors comprise from 50 to 70 percent by weight of at least one ethylenically unsaturated polyester and from 50 to 30 percent by weight of at least one monomer copolymerizable therewith.

The proportions of the precursors of the linear polyurethane to precursors of the cured polyester resin to be used in the production of the polymeric products of our invention will depend on the particular property of the polymeric product which is of interest. For example, where high impact strength is the prime requirement in the polymeric product, it is preferred to use a high proportion, e.g. 50 percent by weight or greater of the precursors of the linear polyurethane. On the other hand, where high flexural strength is the prime requirement, it may be preferred to use a high proportion of cured polyester resin precursors, e.g 50 percent or greater by weight of the composition.

For an optimum balance of properties in the polymeric product, it is preferred to use from 30 to 70 percent by weight of the precursors of the linear polyurethane and 70 to 30 percent by weight of the cured polyester resin precursors.

For optimum properties in the polymeric product, e.g. impact strength, it is preferred that the groups in the difunctional compound and in the ethylenically unsaturated polyester which are reactive with isocyanate groups should be substantially fully reacted with the diisocyanate and to this end it is preferred that the molar proportion of isocyanate groups in the diisocyanate to groups reactive with isocyanate groups in the difunctional compound plus the ethylenically unsaturated polyester be in the range 0.8 to 1 to 1.2 to 1, and more preferably in the range 0.9:1 to 1.15:1.

Some of the properties of the polymeric products of our invention, for example, the flexural properties and the notched impact strength, may be improved by incorporation of fibrous reinforcing material into the polymeric products. The fibrous material may be, for example, glass fiber, carbon fiber, asbestos fiber or fibrous material derived from an organic polymer, for example, a polyester, e.g. poly(ethylene terephthalate) or a polyamide, e.g. poly(hexamethylene adipamide) or the polyamide derived by polymerization of ε-caprolactam or the corresponding aminocarboxylic acid.

Glass fibers may be in any suitable form, e.g. in the form of a matt, ribbons, tapes, continuous fibers or as chopped rovings. Where chopped rovings are used, they are preferably of at least ½ inch in length.

The amount of fibrous material to be incorporated will depend on the desired improvement in the particular property of the polymeric product which is of interest. In general from 5 to 70 percent of fibrous material by weight of the total weight of the fiber reinforced polymeric product is suitable. Where it is desired to effect a substantial improvement in properties, it is preferred to use at least 20 percent by weight of fibrous material. In general, from 20 to 50 percent by weight of fibrous material will suffice.

The fibrous materials may be incorporated into the polymeric product by means which will be apparent to those versed in the art of reinforced resins.

According to a further embodiment of our invention, we provide a process for the production of a shaped polymeric article which comprises polymerizing a homogeneous mixture of the precursors of a linear polyurethane and the precursors of a cured polyester resin as hereinbefore described and shaping the mixture before the polymerization has proceeded to the extent that the mixture is intractable.

By homogeneous mixture, we mean a mixture in which there is no phase separation visible to the unaided eye.

In effecting the process of our invention the precursors of the linear polyurethane and the precursors of the cured polyester resin are therefore chosen so that they are capable of being mixed to form a homogeneous solution. The precursors may, in certain cases, be mixed at ambient temperature to form a homogeneous solution. However, in order that a homogeneous mixture may readily be formed, we find it is often convenient to mix the precursors at elevated temperature. We have found that provided the precursors in the mixture initially form a homogeneous solution, the mixture generally remains homogeneous during the subsequent polymerization and that the resultant shap articles are generally clear and transparent.

Provided the difunctional compound in the polyurethane precursors is within the scope of our invention, homogeneous mixtures of the said precursors may readily be formed. On the other hand, where the said difunctional compound is outside the scope of our invention, and particularly where it is of high molecular weight, for example, of the order of 2,000 or greater, it may be difficult if not impossible to form a homogeneous mixture of the said precursors.

It is not necessary that the precursors of the linear polyurethane and the precursors of the cured polyester resin be mixed to form a homogeneous solution before commencing the polymerization. If desired, the precursors of the linear polyurethane and the ethylenically unsaturated polyester may be mixed and reacted before addition of the polymerizable monomer to the mixture and in a further embodiment of our invention, we provide a process for the production of a shaped polymeric article which comprises reacting at least one difunctional compound, at least one diisocyanate and at least one ethylenically unsaturated polyester as hereinbefore described, forming a homogeneous mixture of the thus formed product and at least one monomer copolymerizable with the ethylenically unsaturated groups in the polyester, causing or allowing the resultant mixture to react and shaping the mixture before the reaction has proceeded to the extent that the mixture is intractable.

Where the shaped polymeric article is prepared from a homogeneous mixture of the precursors of a linear polyurethane and the precursors of a cured polyester resin, the polymerization may be affected in a number of ways. For example, by selection of the components, suitable catalysts and temperatures, the precursors of the linear polyurethane may be substantially fully reacted together and with the polyester before an substantial reaction has taken place between the polyester and the polymerizable monomer. Alternatively, the polyester may be substantially fully reacted wtih the polymerizable monomer before any substantial reaction between the precursors of the linear polyurethane and the polyester has taken place. As yet another alternative, reaction of the precursors of the linear polyurethane together and with the polyester, and reaction of the polyester with the polymerizable monomer may take place substantially simultaneously.

In general, it can be arranged, for example by suitable choice of nature of the components of the mixture and/or by choice of suitable catalysts, for the precursors of the linear polyurethane to react together and with the polyester at ambient temperatures while reaction between the polyester and the polymerizable monomer remains substantially quiescent, and then to activate the latter reaction by raising the temperature. Thus, the process of polymerization may be controlled by suitable adjustment of the temperature.

As stated hereinbefore, catalysts may be used if desired. For example, catalysts for polyurethane formation may be used, e.g. tertiary amines, stannous octoate or dibutyl tin dilaurate. The reaction between the polyester and the polymerizable monomer may also be activated by the presence of a catalyst, for example, a peroxide, e.g. cyclohexanone peroxide or ditertiary butyl peroxide and, if desired, by the presence of an accelerator, e.g. a dilute solution of a cobalt soap.

Suitable shaping methods include casting and compression molding. For example, a shaped article may be produced by charging the components of the mixture into a suitable mold in which they may be polymerized. The mixture in the mold may be compressed during polymerization.

If desired, the mixture of the precursors of a linear polyurethane and the precursors of a cured polyester resin may be shaped before commencement of the polymerization. However, we have also found that the mixture of the said precursors may also be shaped when the mixture is in a partially polymerized state and according to a further embodiment of our invention, we provide a process for the production of a shaped article which comprises a. performing a shaping operation on a partially polymerized composition formed from the precursors of a linear polyurethane and the precursors of a cured polyester resin as hereinbefore described and b. causing or allowing the thus shaped article to retain its shape while completing the polymerization.

The shaping process of our invention may be effected on any suitable shaped partially polymerized composition but it is particularly adapted to the shaping of a partially polymerized composition which is itself in the form of an article of simple profile, e.g. a sheet. In this case, the article or simple profile may be further shaped to an article of more complex profile.

The further shaping may be effected by causing the shaped article of simple profile to conform to the contours of a mold, for example, by mechanical means, or pneumatically, or by a combination thereof. For example, the shaped article of simple profile may be further shaped by pressing between the co-operating parts of a mold.

Other suitable methods of shaping include compression molding, vacuum forming and shaping by application of a positive air pressure to the article of simple profile to cause it to conform to the contours of a mold.

Alternatively, the partially polymerized composition may be in particulate form, e.g. in the form of chip, or molding powder, which may be shaped, for example, by compression molding, injection molding or by extrusion.

Where the partially polymerized composition is in particulate form, e.g. in the form of chip or molding powder, and is to be shaped by extrusion or injection molding, the residence time in the barrel of the extruder or injection molder should not be so great as to cause the polymerization to proceed to an extent which prevents the shaping being successfully completed.

Thus, it is preferred when operating in the manner now being described, that the partially polymerized composition contain a free-radical inhibitor to prevent an undesirable amount of reaction between the polymerizable monomer and the polyester taking place in the barrel of the injection molder or extruder. It is also preferred that the temperature of the injection molder or extruder be below the boiling point of the polymerizable monomer. It is preferred to use a polymerizable monomer which is relatively involatile at the temperature of injection molding or extrusion, e.g. one having a boiling point at least 20°C above the temperature of injection molding or extrusion.

The thus shaped articles or further shaped articles may be removed from the mold and the polymerization completed, e.g. by heating in an oven, provided the article is able to retain its shape. Alternatively, and particularly if the article is not able to retain its shape, the polymerization may be completed while the shape of the article is maintained by the mold.

The extent of the polymerization between the components of the mixture in the composition or in the article of sample profile to be used in the shaping or further shaping process of our invention should be at least such as to enable it to be conveniently handlable. Thus, where the mixture contains only a low concentration of the precursors of the linear polyurethane, it may be desirable to react the precursors together with the polyester almost completely and even partially to react the polyester with the polymerizable monomer before effecting the shaping or further shaping process of our invention. On the other hand, where the mixture comprises a large proportion of the precursors of a linear polyurethane, it may not be necessary to complete the reaction between the precursors of the polyurethane and the polyester before effecting the further shaping process, although there is generally no disadvantage in carrying out this stage of the polymerization substantially to completion as the thus partially polymerized composition should still be tractable. Thus in a further embodiment of our invention, we provide a composition suitable for shaping and comprising a polymerizate of the precursors of a linear polyurethane and the precursors of a cured polyester resin as hereinbefore described in which the polymerization has proceeded to the extent that the difunctional compound, the diisocyanate and the ethylenically unsaturated polyester are substantially fully reacted and in which the ethylenically unsaturated polyester and the monomer copolymerizable with the ethylenically unsaturated groups in the polyester are substantially unreacted or have reacted to an extent such that the composition is tractable. The composition should, of course, not be polymerized to such an extent as to prevent the further shaping process. A suitable amount of polymerization will readily be determined by means of simple experiment. Suitably the mixture may be reacted to the extent that when in the form of an article of simple profile, e.g. a sheet, it is pliable and non-tacky, or when in a particulate form is non-tacky. Suitably the composition, when in a particulate form, may have the consistency of a chip or molding powder.

The invention is now illustrated by the following Examples in which all parts are expressed as parts by weight.

Impact strengths were measured on a Hounsfield impact machine as unnotched samples of dimensions 2 in. × ¼ in. × ⅛ in. Notched impact strengths were measured on similar samples having a ⅛ in. deep notch cut in the 2 × ¼ in. side, the notched radius being 0.01 inch.

Flexural moduli and flexural strengths were measured on a Hounsfield Tensometer at a strain rate of 1 percent per minute (unless otherwise stated) using shaped specimens of dimensions 3 in. × ½ in. × ⅛ in.

Heat distortion temperatures were measured, with the exception of Examples 21 and 22, by heating a sample of dimensions 6 cm × 3 mm × 1.5 mm in an oven at a rate of heating of 1°C per minute, a 20 g. weight being suspended from the sample at a point 25.4 mm from the point at which the sample was clamped, the temperature at which the sample was deflected 30° being taken as the heat distortion temperatures were measured following the procedure described on ASTM D648/66.

In the following examples, certain polyesters are designated by the names Polyester A, Polyester B, etc. The designated products are further characterized as follows:

Polyester A — The unsaturated polyester formed by condensation of propylene glycol, isophthalic acid and fumaric acid, the fumaric acid and isophthalic acid being present in a molar ratio of 3:1.

Polyester B — A mixture of 31 percent by weight styrene and 69 percent weight of an unsaturated polyester, the mixture having an acid value of 34 mg KOH per g and the polyester being formed by condensation of propylene glycol and mixture of maleic anhydride and phthalic anhydride, the maleic and phthalic anhydrides being present in a molar ratio of 2:3.

Polyester C — A mixture of 33 percent by weight styrene, 67 percent by weight unsaturated polyester, the mixture having an acid value of 21 mg KOH per g. The polyester is made condensing propylene glycol and diethylene glycol (3:1 molar ratio) with maleic anhydride and phthalic anhydride (3:2 molar ratio).

Polyester D — A mixture of 30 percent by weight of vinyl monomer (1:1 by weight styrene : methyl methacrylate), 70 percent by weight unsaturated polyester, the mixture having an acid value of 32 mg KOH per g. The polyester is made by condensing propylene glycol with maleic anhydride and phthalic anhydride, the maleic and phthalic anhydrides being present in a molar proportion of 1:2.

Polyester E — A mixture of 40% by weight of vinyl monomer (1:0 by weight styrene and methyl methacrylate), 60% by weight of unsaturated polyester, the mixture having an acid value of 23 mg KOH per g. The polyester is the same as that in Polyester B.

EXAMPLE 1

A 266 parts of 4:4'diphenylmethane diisocyanate were charged to a flask and heated at a temperature of 50°C until clear.

400 parts of a mixture designated Polyester A having an acid value of 25 mg. KOH $g^{-1}$ and hydroxyl value of 2.8 mg KOH $g^{-1}$ and comprising 38 percent by weight of styrene and 62 percent by weight of an unsaturated polyester were similarly heated to a temperature of 50°C and mixed wth the 4:4'-diphenylmethane diisocyanate and maintained at this temperature until the solution was clear. 20 parts of dietertiary butyl peroxide were then added to the mixture followed by 348 parts of oxypropylated bis phenol A (sold commercially as BP-2 by B.P. Chemicals Ltd.) having a molecular weight of approximately 350 which had previously been heated to a temperature of 50°C, and 3 parts of dibutyl tin dilaurate. BP-2 has the structure III in which on average $n$ and $m$ are 1, X is

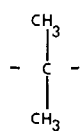

and one of $R_1$ and $R_2$ is H and the other is methyl and provides in the resultant polymeric product units having an average of 17 in-chain atoms.

The clear solution which contained 60.6 percent by weight of polyurethane precursors and 39.4 percent by weight of cured polyester resin precursors was allowed to cool to room temperature and degassed by connecting the flask containing the solution to a vacuum.

A mold was formed by placing a ½ inch wide by ⅛ inch deep brass gasket on the surface of a 6 inch by 6 inch aluminum plate, the surface of which was covered by a poly(ethylene terephthalate) film. The mold was closed by placing a 6 inch by 6 inch aluminum plate covered by a poly(ethylene terephthalate) film on the gasket and the mold was heated in an oven at 100°C.

The mold was removed from the oven, one of the poly(ethylene terephthalate) protected aluminum plates was removed, the degassed mixture prepared above was poured into the mold and the mold was closed by replacing the poly(ethylene terephthalate) film and the aluminum plate.

A 10 Kg. weight was placed on one of the plates of the mold, the mold was allowed to stand at room temperature for 1 hour, and then placed in a hydraulic press and heated for ½ hour at a temperature of 130°C under applied pressure of 1,000 lbs./sq. in. The mold was removed and heated for a further 2½ hours in an oven at a temperature of 130°C.

The molded sheet had the following properties.

| | |
|---|---|
| Flexural modulus | 31,100 Kg.cm$^{-2}$ |
| Flexural breaking strength | 1,080 Kg.cm$^{-2}$ |
| Notched impact strength | 5.55 Kg.cm.cm$^{-2}$ |
| Unnotched impact strength | 59.2 Kg.cm.cm$^{-2}$ |

B

In a comparative experiment to show the properties of a polymeric product prepared in the absence of the polyurethane precursors, 200 parts of Polyester A and a catalyst comprising 8 parts of a dispersion of cyclohexanone peroxide (Catalyst Paste H) and 8 parts of a dilute solution of a cobalt soap (Accelerator E), a catalyst system conventionally used in polyester technology and supplied by Scott Bader and Co. Ltd. were mixed at room temperature and degassed. The mixture was charged to a mold as used above except that the mold was not pre-heated in an oven. The mold and contents were allowed to stand at room temperature for 18 hours and were then heated in an oven for 5 hours at 80°C and for 18 hours at 140°C. The mold was removed from the oven and the sheet removed from the mold.

The sheet had the following properties.

| | |
|---|---|
| Flexural modulus | 33,500 Kg.cm$^{-2}$ |
| Flexural breaking strength | 820 Kg.cm$^{-2}$ |
| Notched impact strength | not measurable |
| Unnotched impact strength | 6.7 Kg.cm.cm$^{-2}$ |

C

In a further comparative experiment to show the properties of a polymeric product prepared in the absence of the difunctional compound, a homogeneous mixture was formed from 1000 parts of Polyester A, 62 parts of 4:4'-diphenylmethane diisocyanate and 20 parts of ditertiary butyl peroxide. The mixture was degassed and charged to a mold as used above and allowed to stand at room temperature for 18 hours and was then heated in an oven at 80°C for 5 hours and at 140°C for 18 hours. The sheet in the mold was found to be cracked and was unsuitable for test.

D

In a further comparative experiment the procedure described in C above was followed except that the ditertiary butyl peroxide was replaced by 40 parts of a dispersion of cyclohexanone peroxide (Catalyst Paste H) and 40 parts of a dilute solution of a cobalt soap (Accelerator E). The mixture was degassed and charged to a mold and was allowed to stand at room temperature for 1 hour and was then heated at 130°C for 3 hours. The molded sheet had the following properties.

| | |
|---|---|
| Flexural modulus | 34,000 Kg.cm$^{-2}$ |
| Flexural breaking strength | 810 Kg.cm$^{-2}$ |
| Unnotched impact strength | 1.05 Kg.cm.cm$^{-2}$ |

EXAMPLE 2

Two homogeneous mixtures were prepared following the procedure of Example 1 from respectively 500 parts and 600 parts of Polyester A, 226 parts and 189 parts of 4:4'-diphenylmethane diisocyanate and 290 parts and 232 parts of the oxypropylated bisphenol A (BP-2). 20 parts of ditertiary butyl peroxide and 3 parts of dibutyl tin dilaurate were present in each mixture. The mixtures contained respectively 50.8 percent by weight and 41.2 percent by weight of polyurethane precursors and 49.2 percent and 58.8 percent by weight of cured polyester resin precursors.

The mixtures were degassed, charged to separate molds and heated following the procedure of Example 1. The properties of the molded sheets are shown in Table 1 below as Experiments A and B respectively.

TABLE 1

| Experiment | Flexural Modulus Kg.cm$^{-2}$ | Flexural Breaking Strength Kg.cm$^{-2}$ | Impact Strength Kg.cm.cm$^{-2}$ | |
|---|---|---|---|---|
| | | | Notched | Unnotched |
| A | 32,800 | 1,310 | 4.50 | 20.0 |
| B | 33,600 | 1,365 | 2.04 | 11.1 |

EXAMPLE 3

A homogeneous mixture was prepared following the procedure of Example 1 from 500 parts of Polyester A, 203 parts of 4:4'-diphenyl methane diisocyanate, 315 parts of poly(propylene glycol) (sold commercially as Niax 425 by Union Carbide), 20 parts of ditertiary butyl peroxide and 3 parts of dibutyl tin dilaurate. The mixture contained 51 percent by weight of polyurethane precursors and 49 percent by weight of cured polyester resin precursors. The poly(propylene glycol) has an average molecular weight of approximately 425 and provides in the resultant polymeric product units having an average of 21 in-chain atoms.

The mixture was degassed, charged to a mold, and heated following the procedure of Example 1.

The molded sheet had the following properties.

| | |
|---|---|
| Flexural modulus | 18,400 Kg.cm$^{-2}$ |
| Flexural breaking strength | 740 Kg.cm$^{-2}$ |
| Notched impact strength | 2.7 Kg.cm.cm$^{-2}$ |
| Unnotched impact strength | 21.5 Kg.cm.cm$^{-2}$ |

By way of comparison and to show the properties of a polymeric product in which the difunctional compound is outside the scope of our invention, the above procedure was followed to prepare a mixture of 500 parts of Polyester A, 86 parts of 4:4'-diphenyl methane diisocyanate, 445 parts of poly(ethylene glycol) of average molecular weight 2000 (Daltocel B56, Imperial Chemical Industries Ltd.) providing in the resultant polymeric product units having an average of 135 in-chain atoms, 3 parts of dibutyl tin dilaurate and 20 parts of ditertiary butyl peroxide. The mixture was in homogeneous and when charged to a mold and heated following the procedure of Example 1 gave a cloudy molded sheet which was tacky and quite unsuitable for testing.

EXAMPLE 4

A homogeneous mixture containing 51 percent by weight of polyurethane precursors and 49 percent by weight of cured polyester resin precursors was prepared following the procedure of Example 1 from 500 parts of Polyester A, 276 parts of 4:4'-diphenylmethane diisocyanate, 241 parts of a condensate formed by reacting 1,2-propylene glycol and adipic acid in a molar ratio of 2.254:1 and having a hydroxyl value of 480 mg. KOH g$^{-1}$ and an acid value of 1.8 mg. KOH g$^{-1}$, 20 parts of ditertiary butyl peroxide and 3 parts of dibutyl tin dilaurate. The condensate provides in the resultant polymeric product units having an average of 12 in-chain atoms.

The mixture was degassed, charged to a mold, and heated following the procedure of Example 1.

The molded properties had the following properties.

| | |
|---|---|
| Flexural modulus | 35,000 Kg.cm$^{-2}$ |
| Flexural strength | 1,500 Kg.cm$^{-2}$ |
| Unnotched impact strength | 8.33 Kg.cm.cm$^{-2}$ |

EXAMPLE 5

A homogeneous mixture as used in Example 2A was prepared from 500 parts of Polyester A, 226 parts of 4:4'-diphenylmethane diisocyanate, 290 parts of the oxypropylated bisphenol A(BP-2), 20 parts of ditertiary butyl peroxide and 3 parts of dibutyl tin dilaurate and the mixture was degassed following the procedure of Example 1. The mixture contained 50.8 percent by weight of polyurethane precursors and 49.2 percent by weight of cured polyester resin precursors.

Two molds were assembled and then heated in an oven following the procedure of Example 1. The molds were removed from the oven, one aluminum plate covered by poly(ethylene terephthalate) film was removed from each mold and, respectively, 1 and 2 random chopped glass fiber matts (Type HPE, Fibreglass Ltd.) were placed in the molds and each mold was filled with the degassed mixture prepared above. The aluminum plate covered by poly(ethylene terephthalate) film was replaced on each mold, a 10 Kg. weight was placed on each mold and the molds were allowed to stand at ambient temperature for 2 hours A non-tacky molded sheet was removed from each mold, each sheet was separately cut into small pieces with a sharp knife and the pieces from each sheet were charged to separate molds formed by a brass gasket on a poly(ethylene terephthalate) film covered aluminum plate and having a cavity of dimensions 3 inch × 4 inch ×⅛ inch deep. Sufficient material was used to just over-fill each mold.

Each mold was closed by a poly(ethylene terephthalate) film covered aluminum plate and was heated in a hydraulic press for ½ hour at 130°C under an applied pressure of 1,000 lb./sq. in.

Each mold was removed from the press and allowed to cool and the molded sheets were removed and heated in an oven at a temperature of 130°C for a further 2½ hours.

The properties of the molded sheets are shown in Table 2 below as Examples A and B respectively, the sheets containing respectively 9 and 18 percent of glass fiber by weight of the fiber reinforced sheet.

TABLE 2

| Experiment | Flexural Modulus Kg.cm$^{-2}$ | Flexural Breaking Strength Kg.cm$^{-2}$ | Notched Impact Strength Kg.cm.cm$^{-2}$ |
|---|---|---|---|
| A | 48,000 | 1,880 | 10.4 |
| B | 60,000 | 2,100 | — |

EXAMPLE 6

A homogeneous mixture was prepared following the procedure of Example 1 from 500 parts of Polyester A, 237 parts of 4:4'-diphenyl methane diisocyanate, 324 parts of oxypropylated biphenol A having a molecular weight of approximately 460 (sold commercially as BP-4 by B. P. Chemicals Ltd.), 20 parts of ditertiary butyl peroxide and 3 parts of dibutyl tin dilaurate, the mixture containing 52.9 percent by weight of polyurethane precursors and 47.1 percent by weight of cured polyester resin precursors. BP-4 has the structure III above in which on average $n$ and $m$ are 2, X is

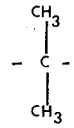

and one of $R_1$ and $R_2$ is H and the other is methyl and provides in the resultant polymeric product units having an average of 23 in-chain atoms.

The mixture was degassed, charged to a mold and heated following the procedure of Example 1. The molded sheet had the following properties.

| | |
|---|---|
| Flexural modulus | 33,000 Kg.cm$^{-2}$ |
| Flexural breaking strength | 1,420 Kg.cm$^{-2}$ |
| Notched impact strength | 2.0 Kg.cm.cm$^{-2}$ |

By way of comparison and to show that properties of a polymeric product in which the difunctional compound is outside the scope of our invention, a homogeneous mixture was prepared following the procedure of Example 1 from 500 parts of Polyester A, 149 parts of 4,4'-diphenyl methane diisocyanate, 382 parts of oxypropylated bisphenol A having a molecular weight of approximately 800 (sold commercially as BP-10 by B. P. Chemicals Ltd.), 20 parts of tertiary butylperoctoate and 3 parts of dibutyl tin dilaurate, the mixture containing 51.5 percent by weight of polyurethane precursors and 48.5 percent by weight of cured polyester resin precursors. BP-10 has the structure III above in which on average $n$ and $m$ are 5, X is

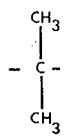

and one of $R_1$ and $R_2$ is H and the other is methyl and provides in the resultant polymeric product units having an average of 41 in-chain atoms.

The mixture was degassed, charged to a mold and heated following the procedure of Example 1 except that whereas in Example 1, the mold was heated in a hydraulic press at a temperature of 130°C and thereafter in an oven at the same temperature, a temperature of 100°C was used in the present Example. The molded sheet had the following properties.

| | |
|---|---|
| Flexural modulus | 11,000 Kg.cm$^{-2}$ |
| Flexural breaking strength | 456 Kg.cm$^{-2}$ |
| Notched impact strength | 0.5 Kg.cm$^{-2}$ |

EXAMPLE 7

Following the procedure of Example 1, molded sheets were prepared from the following mixtures.

A.

236 parts of 4:4'-diphenylmethane diisocyanate, 299 parts of oxypropylated bisphenol A (BP-2), 500 parts of Polyester B, 20 parts of ditertiary butyl peroxide and 3 parts of dibutyl tin dilaurate. Polyester B is a mixture of 69 percent by weight of an unsaturated polyester and 31 percent by weight of styrene, the mixture having an acid value of 34 mg KOH per gm.

B.

A mixture as used in A above except that the Polyester B was replaced by 500 parts of Polyester D. Polyester D is a mixture of 70 percent by weight of an unsaturated polyester and 30 percent weight of styrene, the mixture having an acid value of 32 mg. KOH per gm.

C.

A mixture as used in A above except that the Polyester B replaced by 500 parts of Polyester C. Polyester C is a mixture of 67 percent by weight of an unsaturated polyester and 33 percent by weight of styrene, the mixture having an acid value of 21 mg KOH per gm.

D.

266 parts of 4:4'-diphenylmethane diisocyanate, 299 parts of oxypropylated bisphenol A (BP-2), 500 parts of a mixture of 39 percent by weight of styrene and 61 percent by weight of an unsaturated polyester made by condensing fumaric acid and propylene glycol and having an average molecular weight of 1180, 15 parts of ditertiary butyl peroxide and 3 parts of dibutyl tin dilaurate.

The properties of the molded sheets are shown in Table 3.

TABLE 3

| Experiment | Heat Distortion Temperature °C | Flexural Modulus Kg.cm$^{-2}$ | Impact Strength Kg.cm.cm$^{-2}$ | | Flexural Breaking Strength Kg.cm$^{-2}$ | Polyurethane Precursors % by weight | Cured Polyester Resin Precursors % by weight |
|---|---|---|---|---|---|---|---|
| | | | Notched | Unnotched | | | |
| A | 98 | 29,000 | — | — | 520 | 51.6 | 48.4 |
| B | 90 | 31,500 | — | — | 560 | 51.6 | 48.4 |
| C | 114 | 29,500 | 2.1 | 11.6 | 1330 | 51.6 | 48.4 |
| D | 150 | 28,500 | — | — | 1360 | 52.0 | 48.0 |

In comparative experiments to show the properties of polymeric products prepared in the absence of polyurethane precursors, molded sheets were prepared in a mold as used in Example 1 from 200 parts of each of the cured polyester resin precursors as used above. In each case, 8 parts of each of Catalyst Paste H and Accelerator E were used and the molds and contents were allowed to stand for 1 hour at room temperature and were then heated at 130°C for 3 hours.

The properties of the molded sheets are shown in Table 4.

TABLE 4

| Experiment | Flexural Modulus Kg.cm$^{-2}$ | Flexural Breaking Strength Kg.cm$^{-2}$ | Impact Strength Kg.cm.cm$^{-2}$ | |
|---|---|---|---|---|
| | | | Notched | Unnotched |
| A | 37,000 | 1070 | — | — |
| B | 30,000 | 1120 | — | — |
| C | 35,000 | 1630 | — | 6.0 |
| D | 37,000 | 325 | — | — |

EXAMPLE 8

Molded sheets were prepared following the procedure of Example 1 from homogeneous mixtures containing 299 parts of oxypropylated bisphenol A (BP-2), 319 parts of 4:4'-diphenylmethane diisocyanate, 176 parts of a condensate of fumaric acid and propylene glycol having an average molecular weight of 232, 15 parts of ditertiary butyl peroxide, and respectively 120 parts, 190 parts, 251 parts and 327 parts of styrene.

The properties of the molded sheets are given in Table 5 as experiments A, B, C and D.

TABLE 5

| Experiment | Flexural Modulus Kg.cm$^{-2}$ | Flexural Breaking Strength Kg.cm.$^{-2}$ | Notched Impact Strength Kg.cm.cm$^{-2}$ | Heat Distortion Temperature °C | Polyurethane Precursors % by weight | Cured Polyester Resin Precursors % by weight | Weight Proportion Polyester Styrene |
|---|---|---|---|---|---|---|---|
| A | 30,100 | 1400 | 1.4 | 112 | 67.5 | 32.5 | 1.47:1 |
| B | 30,700 | 1390 | 7.0 | 132 | 63.0 | 37.0 | 0.93:1 |
| C | 28,000 | 970 | 3.8 | 122 | 59.2 | 40.8 | 0.70:1 |
| D | 27,500 | 1180 | 4.5 | 127 | 55.0 | 45.0 | 0.54:1 |

EXAMPLE 9

In order to show the effect of variation of the ratio of isocyanate groups to groups reactive with isocyanate molded sheets were prepared following the procedure of Example 1 from 500 parts of Polyester A, 20 parts of ditertiary butyl peroxide, 3 parts of dibutyl tin dilaurate, and respectively 226 parts, 226 parts, 226 parts, 249 parts and 272 parts of 4:4'-diphenylmethane diisocyanate and respectively 348 parts, 319 parts, 290 parts, 290 parts and 290 parts of oxypropylated bisphenol A (BP-2).

The average molecular weight of the unsaturated polyester in the Polyester A was 2500 and the average molecular weight of the BP-2 was 371.

The properties of the resultant molded sheets are given in Table 6 as Experiments A, B, C, D and E.

EXAMPLE 10

A molded sheet was prepared from a mixture of 182 parts of 4:4'-diphenylmethane diisocyanate, 212 parts of oxypropylated bisphenol A (BP-2), 176 parts of vinyl toluene (mixed meta and para isomers supplied by Koch-Light Ltd.), 264 parts of an unsaturated polyester made by condensing fumaric acid, phthalic anhydride and propylene glycol in a molar ratio of 2:2.4:5 and having an acid value of 12.2 mg. KOH per g., 18 parts of tertiary butyl peroctoate and 2 parts of dibutyl tin dilaurate. The procedure of Example 1 was followed except that the mold was preheated to a temperature of 70°C before being charged with the mixture and the mixture which contained 47.1 percent by weight of the polyurethane precursors and 52.9 percent by weight of cured polyester resin precursors was polymerized at a temperature of 100°C.

The resultant molded sheet had the following properties

| | |
|---|---|
| Flexural modulus | 31,000 Kg.cm$^{-2}$ |
| Flexural breaking strength | 1,270 Kg.cm$^{-2}$ |

EXAMPLE 11

A molded sheet was prepared following the procedure of Example 1 from a mixture of 500 parts of Polyester A, 340 parts of 4:4'-diphenylmethane diisocyanate, 249 parts of oxypropylated bisphenol A (BP-2), 40 parts of propylene glycol, 20 parts of ditertiary butyl peroxide and 2 parts of dibutyl tin dilaurate. The mixture contained 55.7 percent by weight of polyurethane precursors and 44.3 percent by weight of cured polyester resin precursors, the propylene glycol providing units in the resultant polymeric product having 4 in-chain atoms.

TABLE 6

| Exp. | Flexural Modulus Kg.cm$^{-2}$ | Flexural Breaking Strength Kg.cm$^{-2}$ | Impact Strength Kg.cm.cm$^{-2}$ | | Heat Distortion Temperature °C | Molar Ratio NCO:groups reactive with NCO | Polyurethane Precursors % by weight | Cured Polyester Resin Precursors % by weight |
|---|---|---|---|---|---|---|---|---|
| | | | Notched | Unnotched | | | | |
| A | 33,600 | 200 | — | 1.1 | 119 | 0.86 | 53.4 | 46.6 |
| B | 32,400 | 890 | — | 10.9 | 133 | 0.94 | 52.2 | 47.8 |
| C | 32,800 | 1310 | 4.5 | 20.0 | 144 | 1.00 | 50.9 | 49.1 |
| D | 32,400 | 1300 | 1.9 | 19.5 | 139 | 1.10 | 52.0 | 48.0 |
| E | 33,600 | 1130 | — | 2.9 | 134 | 1.20 | 52.9 | 47.1 |

The resultant molded sheet had the following properties

| | |
|---|---|
| Flexural modulus | 28,600 Kg.cm$^{-2}$ |
| Flexural breaking strength | 1,460 Kg.cm$^{-2}$ |
| Impact strength: Notched | 4.3 Kg.cm.cm$^{-2}$ |
| Unnotched | 26.1 Kg.cm.cm$^{-2}$ |
| Heat distortion temperature | 135°C |

EXAMPLE 12

The molded sheets were prepared following the procedure of Example 1 from the mixtures of 500 parts of Polyester A, 20 parts of ditertiary butyl peroxide, 4 parts of dibutyl tin dilaurate, respectively 340 parts of oxypropylated bisphenol A (BP-2) and 363 parts of oxypropylated bisphenol A (BP-4), and respectively 181 parts and 158 parts of mixed isomers of toluene diisocyanate (Suprasec EN, Imperial Chemical Industries Ltd.). The mixtures each contained 51 percent by weight of polyurethane precursors and 49 percent by weight of cured polyester resin precursors and the resultant molded sheets had flexural moduli of respectively 39,300 Kg.cm$^{-2}$ and 37,300 Kg.cm$^{-2}$.

EXAMPLE 13

Two molded sheets were prepared from the following homogeneous mixtures (following the procedure of Example 1) except that the mixtures after being charged to the mold were allowed to stand at room temperature for 24 hours and were then heated at a temperature of 130°C for a further 3 hours.

A.

500 parts of Polyester A, 338 parts of oxypropylated bisphenol A (BP-2), 185 parts of hexamethylene diisocyanate, 20 parts of ditertiary butyl peroxide and 7 parts of dibutyl tin dilaurate. (51 percent by weight of polyurethane precursors and 49 percent by weight of cured polyester resin precursors).

B.

500 parts of Polyester A, 248 parts of oxypropylated bisphenol A (BP-2), 214 parts of 4:4'-dicyclohexylmethane diisocyanate, 20 parts of ditertiary butyl peroxide, and 6 parts of dibutyl tin dilaurate (48 percent by weight of polyurethane precursors and 52 percent by weight of cured polyester resin precursors).

The sheets removed from the molds had the following properties

| | | |
|---|---|---|
| A | Flexural modulus | 33,000 Kg.cm$^{-2}$ |
| | Flexural breaking strength | 1,110 Kg.cm$^{-2}$ |
| B | Flexural modulus | 33,000 Kg.cm$^{-2}$ |
| | Flexural breaking strength | 840 Kg.cm$^{-2}$ |

EXAMPLE 14

A homogeneous mixture was prepared following the procedure of Example 1 from 500 parts of Polyester A, 183 parts of 4:4'-diphenylmethane diisocyanate, 348 parts of oxypropylated bisphenol A having an average molecular weight of 575 (sold commercially as BP-6 by B P Chemicals Ltd.), 20 parts of tertiary butyl peroctoate and 2 parts of dibutyl tin dilaurate. BP-6 has the structure III above in which on average $n$ and $m$ are 3, X is

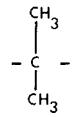

and one of $R_1$ and $R_2$ is H and the other is methyl and provides in the resultant polymeric product units having an average 29 in-chain atoms. The mixture was degassed and charged to a mold and heated following the procedure of Example 1 except that the mold was heated at a temperature of 100°C instead of 130°C.

The molded sheet had the following properties

| | |
|---|---|
| Flexural modulus | 34,000 Kg.cm$^{-2}$ |
| Flexural breaking strength | 1,240 Kg.cm$^{-2}$ |
| Notched impact strength | 0.60 Kg.cm.cm$^{-2}$ |

In a further experiment the above procedure was repeated except that 166 parts of 4:4'-diphenylmethane diisocyanate and, in place of the BP-6, 365 parts of oxypropylated bisphenol A having an average molecular weight of 675 (sold commercially as BP-8 by B P Chemical Ltd.) were used. BP-8 has the structure III above in which on average $n$ and $m$ are 4, X is

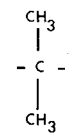

one of $R_1$ and $R_2$ are H and the other is methyl and provides in the resultant polymeric product units having an average 35 in-chain atoms.

The molded sheet had the following properties

| | |
|---|---|
| Flexural modulus | 24,200 Kg.cm.$^{-2}$ |
| Flexural breaking strength | 865 Kg.cm.$^{-2}$ |
| Notched impact strength | 0.60 Kg.cm.cm$^{-2}$ |

In each of the above experiments, the homogeneous mixtures contained 51.5 percent by weight of polyurethane precursors and 48.5 percent by weight of cured polyester resin precursors.

EXAMPLE 15

A homogeneous mixture was prepared following the procedure of Example 1 from 480 parts of Polyester A, 411 parts of 4:4'-diphenylmethane diisocyanate, 207 parts of oxypropylated bisphenol A (BP-2), 101 parts of diethylene glycol (providing in the resultant polymeric product units having 7 in-chain atoms) and 4 parts of tertiary butyl perbenzoate. The mixture, which contained 60 percent by weight of polyurethane precursors and 40 percent by weight of cured polyester resin precursors, was then degassed and charged to a vertically disposed mold formed from two 6 inch × 6 inch aluminum plates and a ⅛ inch deep by ½ inch wide rubber gasket, the gasket having a small hole through which the mold was filled with the mixture. The mold was then heated in an oven for 1 hour at a temperature of 115°C.

The sheet removed from the mold had the following properties

| | |
|---|---|
| Flexural modulus | 29,200 Kg.cm.$^{-2}$ |
| Flexural breaking strength | 1,490 Kg.cm.$^{-2}$ |
| Impact strength notched | 5.3 Kg.cm.cm.$^{-2}$ |
| unnotched | 73 Kg.cm.cm.$^{-2}$ |

EXAMPLE 16

A.

A homogeneous mixture was prepared following the procedure of Example 1 from 500 parts of Polyester A, 258 parts of 4:4'-diphenylmethane diisocyanate, 273 parts of polyethylene glycol of molecular weight approximately 300 (sold commercially as Caradol 300 by Shell Chemicals Ltd.) providing units in the resultant polymeric product having an average of 18 in-chain atoms and 20 parts of ditertiary butyl peroxide. The mixture was degassed, charged to a mold and allowed to stand at room temperature for 24 hours and thereafter heated following the procedure of Example 1.

The molded sheet had the following properties

| | |
|---|---|
| Flexural modulus | 34,500 Kg.cm.$^{-2}$ |
| Flexural breaking strength | 1,150 Kg.cm.$^{-2}$ |

B.

A homogeneous mixture was prepared following the procedure of Example 1 from 500 parts of Polyester A, 378 parts of 4:4'-diphenylmethane dilaurate diisocyanate, 153 parts of 1:3-cyclohexane diol, providing units in the polymeric product having 5 in-chain atoms, 20 parts of ditertiary butyl peroxide and 1.5 parts of dibutyl tin dilaurate. The mixture was degassed and charged to a mold following the procedure of Example 1.

After standing at room temperature for 1 hour the contents were removed from the mold, broken into pieces and charged to a mold as used in Example 1. The mold and contents were then heated in a hydraulic press for ½ hour at 130°C under an applied pressure of 1,000 lb. per sq. in. The mold was then removed from the press and heated in an oven at 130°C for a further 2 hours.

The molded sheet had the following properties

| | |
|---|---|
| Flexural modulus | 33,000 Kg.cm$^{-2}$ |
| Flexural breaking strength | 500 Kg.cm$^{-2}$ |

EXAMPLE 17

Fiber reinforced molded sheets were prepared in molds as used in Example 1. Before filling the molds, they were assembled and heated in an oven following the procedure described in Example 1 and were then removed from the oven. The molds were then charged with fibers which were aligned substantially in one direction in the mold and the homogeneous mixtures of polyurethane precursors and cured polyester resin precursors were charged to separate molds. The molds and contents were then heated following the procedure described in Example 1.

Molded sheets were prepared from the following compositions

A.

A homogeneous mixture of polyurethane precursors and cured polyester resin precursors having the composition of and made following the directions of Example 2B above and 36 percent of E-glass continuous glass fiber rovings (Fibreglass Ltd.) by weight of the homogeneous mixture plus glass fiber.

B.

A homogeneous mixture having the composition of and made following the directions of Example 2A above and 39 percent by weight of E-glass continuous glass fiber rovings.

C.

A homogeneous mixture having the composition of and made following the direction of Example 2A above and 44 percent by weight of carbon fiber (Moganite "Modmor" Type 1, untreated high modulus graphite fiber).

D.

A homogeneous mixture having the composition of and made following the directions of Example 2A above and 20 percent by weight of poly(ethylene terephthalate) fibre (2 denier normal tenacity fibre free of finish and heat set at 140°C).

In the test samples cut from the resultant fiber-reinforced molded sheets, the fibers were aligned lengthwise in the samples. Thus, flexural properties were measured on samples of dimensions 3 inch × ½ inch × ⅛ inch with the fibers aligned substantially parallel to the 3-inch side and impact strengths were measured on samples of dimensions 2 inch × ¼ inch × ⅛ inch with the fibers aligned substantially parallel to the 2-inch side.

The properties of the fiber reinforced sheet are given in Table 7.

TABLE 7

| Experiment | Flexural Modulus Kg.cm$^{-2}$ | Flexural Breaking Strength Kg.cm$^{-2}$ | Impact Strength Kg.cm.cm$^{-2}$ | |
|---|---|---|---|---|
| | | | Notched | Unnotched |
| A | — | — | 169 | — |
| B | 160,000 | 5,290 | — | — |
| C | 321,000 | 4,220 | — | — |
| D | 36,100 | 1,260 | 30 | 130 |

EXAMPLE 18

A homogeneous mixture was prepared from 500 parts of Polyester A, 239 parts of 4:4'-diphenylmethane diisocyanate, 291 parts of oxypropylated bisphenol A (BP-2), 20 parts of ditertiary butyl peroxide and 3 parts of dibutyl tin dilaurate following the procedure described in Example 1, the mixture containing 51.5 percent by weight of polyurethane precursors and 48.5 percent by weight of cured polyester resin precursors.

The mixture was degassed and cast onto a poly(ethylene terephthalate) covered aluminum plate which had previously been heated to a temperature of 100°C and the mixture left to polymerize for 3 hours. The resultant partially polymerized material was removed from the plate and dissolved in methylene chloride to give a 10 percent solution.

Glass fiber and carbon fiber prepregs were prepared by placing glass fiber and carbon fiber (as used in Example 17) on separate polytetrafluoroethylene coated glass cloths, the fibers being aligned substantially unidirectionally, and impregnating the fibers with the solution as prepared above. The methylene chloride was allowed to evaporate and the resulting prepregs were cut to the shape of a mold as used in Example 1. The prepregs were charged to separate molds and stacked with the fibers aligned substantially unidirectionally. The molds were compression molded at 130°C for ½ hour under a pressure of 1,000 lb./sq. in. and finally heated in an oven at a temperature of 130°C for 2 hours.

The properties of the molded sheets were measured following the procedure described in Example 17.

The properties of the glass fiber reinforced sheet which contained 61 percent by weight of glass fiber by weight of the fiber reinforced sheet were as follows:

| | |
|---|---|
| Flexural modulus | 228,000 Kg.cm$^{-2}$ |
| Flexural breaking strength | 7,030 Kg.cm$^{-2}$ |
| Notched impact strength | 220 Kg.cm.cm$^{-2}$ |

The properties of the carbon fiber reinforced sheet which contained 61 percent by weight of carbon fiber by weight of the fiber reinforced sheet were as follows:

| | |
|---|---|
| Flexural modulus | 454,000 Kg.cm$^{-2}$ |
| Flexural breaking strength | 6,280 Kg.cm$^{-2}$ |
| Notched impact strength | 100 Kg.cm.cm$^{-2}$ |

EXAMPLE 19

A homogeneous mixture was prepared following the procedure described in Example 2A above and a non-tacky fiber-reinforced molded sheet was prepared therefrom following the molding procedure described in Example 5 above, the fiber being 2 inch lengths of poly(ethylene terephthalate) fiber as used in Example 17.

The non-tacky molded sheet was removed from the mold, cut into small pieces, charged to a mold and heated following the procedure described in Example 5 above.

The resultant fiber-reinforced molded sheet had a notched impact strength of 17.9 Kg.cm.cm$^{-2}$.

EXAMPLE 20

A homogeneous mixture was prepared following the procedure described in Example 1 from 400 parts of Polyester A, 162 parts of 4:4'-diphenylmethane diisocyanate, 191 parts of oxypropylated bisphenol A (BP-2), 15 parts of tertiary butyl peroctoate, 0.18 parts of hydroquinone and 3 parts of dibutyl tin dilaurate, the mixture containing 46.8 percent by weight of polyurethane precursors and 53.2 percent by weight of cured polyester resin precursors.

Glass fibers (E-glass roving, Fibreglass Ltd.) chopped to ¾ inch lengths were placed randomly in a mold as used in Example 1 except that the gasket of the mold was 1/16 inch deep.

The fibers in the mold were impregnated with the homogeneous mixture prepared above and the mold was closed and lightly pressed by hand to remove excess mixture from the mold.

The mold was heated in an oven at 80°C for 10 minutes. The non-tacky partially polymerized sheet removed from the mold contained 25 percent of glass fibers by weight of the sheet.

The sheet was then clamped against a silicone rubber mold having a dome-shaped cavity of diameter 1¾ inch and maximum depth of ½ inch and the mold and sheet were placed in an oven at a temperature of 90°C and the sheet was forced into the cavity of the mold by application of compressed air at a positive pressure of 8 lb./sq. in. After heating for 20 minutes, the shaped polymerized sheet was removed from the mold.

In a further experiment, a non-tacky partially polymerized sheet prepared as described above was clamped to a circular aluminum plate of diameter 6 inches and having a cylindrical cavity of diameter 2 inches and a depth of ½ inch. The aluminum plate was coated with a silicone release agent. The aluminum plate was heated to 95°C on an electrically heated plate and the partially polymerized sheet was forced into the cavity of the aluminum plate by applying to the sheet with hand pressure a cylindrical plunger of diameter 1¾ inch. After heating for 10 minutes, the shaped polymerized sheet was removed from the mold.

In a further experiment, a non-tacky partially polymerized sheet was prepared as described above except that homogeneous mixture comprised 300 parts of Polyester A, 177 parts of 4:4'-diphenylmethane diisocyanate, 117 parts of oxypropylated bisphenol A (BP-2), 24 parts of propylene glycol, 20 parts of tertiary butyl peroctoate and 2 parts of dibutyl tin dilaurate (i.e., 51.7 percent by weight of polyurethane precursors and 48.3 percent by weight of cured polyester resin precursors) and the mixture containing glass fiber was allowed to stand in a mold at room temperature for 24 hours.

The partially polymerized sheet was clamped to a mold which was in the form of a plate having a frustoconical cavity of depth ¼ inch, the diameter of the opening of the cavity being 1¼ inch and the diameter of the base of the cavity being ¾ inch. The mold and sheet were placed in an oven at 100°C and the sheet was vacuum formed into the shape of the cavity. After heating for 15 minutes, the shaped polymerized sheet was removed from the mold.

EXAMPLE 21

A homogeneous mixture was prepared at 60°C from 320 parts of Polyester A, 216 parts of 4:4'-diphenyl methane diisocyanate, 275 parts of oxypropylated bisphenol A (BP-2) and 6 parts of Catalyst Paste B (a dispersion of benzoyl peroxide supplied by Scott Bader and Co. Ltd.). The mixture was degassed and charged at room temperature to a mold formed by a ½ inch wide by ⅛ inch deep poly(vinyl chloride) gasket between two 8 inch × 8 inch glass plates.

The mold and contents were allowed to stand at room temperature for 1 hour and were then heated in an oven at 130°C for 2 hours. The resultant molded sheet had the following properties.

| | |
|---|---|
| Flexural modulus | 31,000 Kg.cm$^{-2}$ |
| Flexural breaking strength | 1,720 Kg.cm$^{-2}$ |
| Notched impact strength | 4.8 Kg.cm.cm$^{-2}$ |
| Heat distortion temperature | 115°C |

(ASTM D648/56 66 lb./sq.in.)

In a further experiment, the above procedure was repeated except that the BP-2 was replaced by 306 parts of oxypropylated bisphenol A (BP-4) and 183 parts of 4:4'-diphenylmethane diisocyanate were used.

The resultant molded sheet had the following properties.

| | |
|---|---|
| Flexural modulus | 32,500 Kg.cm$^{-2}$ |
| Flexural breaking strength | 1,090 Kg.cm$^{-2}$ |
| Notched impact strength | 6.1 Kg.cm.cm$^{-2}$ |

In the above experiments, the mixtures contained 60.5 percent by weight of polyurethane precursors and 39.5 percent by weight of cured polyester resin precursors and the flexural properties were measured at a strain rate of 10 percent per minute.

EXAMPLE 22

450 parts of an unsaturated polyester having an acid value of 31 mg. KOH per g. prepared by condensing phthalic anhydride, maleic anhydride and propylene glycol in a molar proportion of 1:1:2 were heated to 90° to 100°C and mixed with 410 parts of oxypropylated bisphenol A (BP-2) which had been similarly heated. 50 parts of diallyl phthalate and 0.5 parts of tertiary butyl catechol were added to the solution. The solution was allowed to cool to 70°C and 10 parts of ditertiary butyl peroxide and 340 parts of 4:4'-diphenylmethane diisocyanate were added. The resultant mixture which contained 60 percent by weight of polyurethane precursors and 40 percent by weight of cured polyester resin precursors was degassed and poured onto a metal plate and allowed to stand at room temperature for 16 hours.

The resultant glass-like material was broken into small pieces and charged to a mold as used in Example 1 and molded under pressure at 160°C for 10 minutes. The molded sheet had the following properties

| | |
|---|---|
| Flexural modulus | 33,500 Kg.cm$^{-2}$ |
| Flexural breaking strength | 1,300 Kg.cm$^{-2}$ |
| Notched impact strength | 2.2 Kg.cm.cm$^{-2}$ |
| Heat distortion temperature | 71°C |

(ASTM D648/56 66 lb./sq.in.).

EXAMPLE 23

A molded sheet was prepared following the procedure of Example 1 from 500 parts of Polyester E, a methyl methacrylate modified polyester resin containing 60 percent by weight of polyester, the Polyester E having an acid value of 23 mg KOH per g, 239 parts of 4:4'-diphenylmethane diisocyanate, 291 parts of BP-2, 20 parts of ditertiary butyl peroxide and 2 parts of dibutyl tin dilaurate. (51.5 percent by weight of polyurethane precursors and 48.5 percent by weight of cured polyester resin precursors).

The molded sheet had the following properties

| | |
|---|---|
| Flexural modulus | 34,000 Kg.cm$^{-2}$ |
| Flexural breaking strength | 1,510 Kg.cm$^{-2}$ |

In a comparative experiment to show the properties of a polymeric product prepared in the absence of polyurethane precursors, a molded sheet was prepared from Polyester E following the procedure described in the comparative experiments of Example 7.

The molded sheet had the following properties.

| | |
|---|---|
| Flexural modulus | 36,800 Kg.cm$^{-2}$ |
| Flexural breaking strength | 925 Kg.cm$^{-2}$ |

We claim:
1. A polymeric product formed from
   a. 5 percent to 95 percent by weight of the precursors of a linear polyurethane consisting of at least one diisocyanate and at least one difunctional compound free from ethylenic unsaturation and containing two groups reactive with isocyanate groups, each unit derived from the difunctional compound in the polymeric product providing an average of not more than 35 in-chain atoms in the macromolecular chains of said product, and said difunctional compound being selected from the group consisting of diols, diacids, and low molecular weight condensates thereof, and
   b. 95 percent to 5 percent by weight of the precursors of a cured polyester resin consisting of
      i. at least one ethylenically unsaturated polyester containing in each molecule at least two groups reactive with isocyanate groups, and
      ii. at least one monomer copolymerizable with the ethylenically unsaturated groups in the polyester, the proportion of ethylenically unsaturated polyester to monomer copolymerizable therewith being in the range 70%:30% to 10%:90% by weight, the molar proportion of isocyanate groups in the diisocyanate to groups reactive with isocyanate groups in the difunctional compound plus groups reactive with isocyanate groups in the ethylenically unsaturated polyester being in the range 0.8:1 to 1.2:1, said polymeric product being formed by a reaction of the precursors of the linear polyurethane together and with the ethylenically unsaturated polyester and by copolymerization of the monomer with the ethylenically unsaturated groups in the polyester.

2. A polymeric product as claimed in claim 1 which is formed from 30 percent to 70 percent by weight of polyurethane precursors and 70 percent to 30 percent by weight of cured polyester resin precursors.

3. A polymeric product as claimed in claim 1 in which the molar proportion of isocyanate groups in the diisocyanate to groups reactive with isocyanate groups in the difunctional compound plus ethylenically unsaturated polyester is in the range 0.9:1 to 1.15:1.

4. A polymeric product as claimed in claim 1 in which in the polyurethane precursors the diisocyanate is selected from the group consisting of 4:4'-diphenylmethane diisocyanate, dicyclohexylmethane diisocyanate, hexamethylene diisocyanate, 2:4-toluene diisocyanate, 2:6-toluene diisocyanate, and a mixture of said toluene diisocyanates.

5. A polymeric product as claimed in claim 1 in which in the polyurethane precursors the difunctional compound is a diol.

6. A polymeric product as claimed in claim 5 in which the diol has the structure

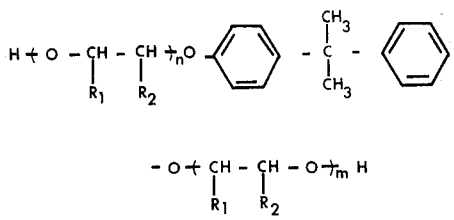

where $R_1$ and $R_2$ are selected from the group consisting of hydrogen atoms and hydrocarbyl groups and $n$ and $m$ are each whole numbers, $n$ plus $m$ being in the range 2 to 4.

7. A polymeric product as claimed in claim 6 in which one of $R_1$ and $R_2$ is H and the other is methyl.

8. A polymeric product as claimed in claim 5 in which the diol is selected from the group consisting of poly(ethylene glycol), diethylene glycol and cyclohexane-1:3-diol.

9. A polymeric product as claimed in claim 1 in which in the polyurethane precursors the difunctional compound is a polyester.

10. A polymeric product as claimed in claim 9 in which the polyester is a condensate of propylene glycol and adipic acid.

11. A polymeric product as claimed in claim 1 which contains fiber reinforcement.

12. A process for the production of a shaped polymeric article which comprises polymerizing a homogeneous mixture of the precursors of a linear polyurethane and the precursors of a cured polyester resin as described in claim 1 and shaping the mixture before the polymerization has proceeded to the extent that the mixture is intractable.

13. A process for the production of a shaped polymeric article which comprises reacting at least one difunctional compound, at least one diisocyanate and at least one ethylenically unsaturated polyester as described in claim 1, forming a homogeneous mixture of the thus formed product and at least one monomer copolymerizable with the ethylenically unsaturated groups in the polyester, causing or allowing the resultant mixture to react and shaping the mixture before the reaction has proceeded to the extent that the mixture is intractable.

14. A process for the production of a shaped polymeric article which comprises the steps of
a. performing a shaping operation on a partially polymerized composition formed from the precursors of a linear polyurethane and the precursors of a cured polyester resin as described in claim 1, and
b. causing or allowing the thus shaped article to retain its shape while completing the polymerization.

15. A process as claimed in claim 14 in which the partially polymerized composition is in the form of a sheet.

16. A process as claimed in claim 14 in which the partially polymerized composition is in a particulate form.

17. A composition suitable for shaping and comprising a polymerizate of the precursors of a linear polyurethane and the precursors of a cured polyester resin as described in claim 1 in which the polymerization has proceeded to the extent that the difunctional compound, the diisocyanate and the ethylenically unsaturated polyester are substantially fully reacted and in which the ethylenically unsaturated polyester and the monomer copolymerizable with the ethylenically unsaturated groups in the polyester are substantially unreacted or have reacted to an extent such that the composition is tractable.

* * * * *